United States Patent Office 3,276,883
Patented Oct. 4, 1966

3,276,883
REFRACTORY COMPOSITION AND METHOD OF PREPARATION
David H. Hubble, Franklin Township, Westmoreland County, and Charles K. Russell, Monroeville Borough, Allegheny County, Pa., assignors to United States Steel Corporation, a corporation of Delaware
No Drawing. Filed May 3, 1965, Ser. No. 452,901
5 Claims. (Cl. 106—62)

This invention relates to an improved periclase refractory composition and to the method of preparing it.

An object of the invention is to provide an improved periclase refractory composition which is especially suited for making brick used in basic oxygen steelmaking furnaces and having superior hot strength and resistance to slagging.

A further object is to provide a composition of the foregoing type and a method of preparing it in which we incorporate alumina and strontium oxide in the periclase in critical proportions.

According to our invention, we lightly calcine magnesia at a temperature of about 1800 to 2500° F. The magnesia should have an MgO content of at least 95 to 98 percent or preferably 97 to 98 percent. We mix with the calcined magnesia about 1 to 5 percent by weight SrO and about 1 to 8 percent by weight $Al_2O_3$ or preferably 1 to 2 percent SrO and 2 to 4 percent $Al_2O_3$. We may add the SrO as the carbonate, sulfate or oxide, and the $Al_2O_3$ as oxide or other forms which yield oxide on calcining. The ratio of SrO to $Al_2O_3$ should be 1 or less, and the ratio of SrO plus CaO to $SiO_2$ should be at least 2 to 1. Although we normally do not add either CaO or $SiO_2$, they are present in minor amounts as impurities. We briquette the mixture and fire it at a temperature of about 2800 to 3100 F. Next we crush the fired product and grind it into suitable grain size fractions for brickmaking. We may use this prepared grain as all or only a portion of a total brick batch. We have found we gain the greatest advantage when we use the grain as approximately one-fifth to one-half the batch, either as a coarse grain fraction or as ball-mill fines, the balance being 95 to 98 percent MgO periclase.

The following table furnishes specific examples which demonstrate the advantages of our invention:

*Comparison of properties for commercial and experimental periclase brick*

| Description of Brick | | Burning Temp., F. | Apparent Porosity, percent | Modulus of Rupture, p.s.i. at— | | Relative Slag Erosion [1] |
| --- | --- | --- | --- | --- | --- | --- |
| Coarse Fraction 60% | Fine Fraction 40% | | | 2,300 F. | 2,700 F. | |
| Commercial Grain with Normal CaO/$SiO_2$ Ratio. | | | 16-21 | 280-375 | 80-150 | 0.9-1.3 |
| Commercial Grain with High CaO/$SiO_2$ Ratio. | | | 16-20 | 600-1,550 | 280-450 | 0.8-1.2 |
| Synthetic Grain Made From Magnesia +2.1% SrO and 2.1% $Al_2O_3$. | | 3,100 | 20.3 | 450 | [2] ND | 0.8 |
| Commercial 97% MgO Grain | Synthetic Grain Made From Magnesia+2.1% SrO and 2.1% $Al_2O_3$. | 2,800<br>3,100 | 16.3<br>15.2 | 1,550<br>1,580 | 880<br>1,080 | 0.6<br>0.5 |
| Synthetic Grain Made From Magnesia +2.1% SrO and 2.1% $Al_2O_3$. | Commercial 97% MgO Grain | 2,800<br>3,100 | 16.8<br>15.8 | 1,450<br>1,600 | 1,020<br>1,250 | 0.5<br>0.5 |
| Commercial 97% MgO Grain | ½ Commercial 97% MgO Grain ½ Synthetic Grain Made From Magnesia+2% SrO and 4% $Al_2O_3$. | 2,800<br>3,100 | 17.5<br>16.3 | 1,600<br>1,600 | 1,250<br>1,390 | ND<br>ND |

[1] Relative Indices; Burned Periclase Brick=1.0 (low number less erosion).
[2] Not Determined.

From the foregoing description and examples, it is seen that our invention affords a refractory composition of particularly desirable characteristics for brick used in basic oxygen steelmaking furnaces, both as to mechanical strength at high temperatures, and resistance to slagging. We attain these results with controlled additions of $Al_2O_3$ and SrO. We believe the results are unexpected, since the prior art leads one to believe the $Al_2O_3$ content of bricks of this type should be kept to a minimum.

While we have described only certain preferred modes of practicing our invention and preferred ranges, it is apparent other modifications may arise. Therefore, we do not wish to be limited to the disclosure set forth, but only by the scope of the appended claims.

We claim:
1. A refractory composition for use in making brick consisting of lightly calcined magnesia, about 1 to 5 percent by weight SrO, and about 1 to 8 percent by weight $Al_2O_3$, the maximum ratio of SrO to $Al_2O_3$ being 1.
2. A composition as defined in claim 1 in which the magnesia is about 95 to 98 percent MgO, the content of

SrO is about 1 to 2 percent, the content of $Al_2O_3$ is about 2 to 4 percent, and the ratio of SrO plus CaO to $SiO_2$ is at least 2 to 1.

3. A method of preparing a refractory composition for use in making brick comprising mixing with lightly calcined magnesia about 1 to 5 percent by weight SrO and about 1 to 8 percent by weight $Al_2O_3$ to provide a maximum ratio of SrO to $Al_2O_3$ of 1, briquetting the mixture, firing the briquettes at a temperature of about 2800 to 3100 F., and crushing the fired briquettes.

4. A method of preparing a refractory composition for use in making brick comprising mixing with lightly calcined magnesia about 1 to 5 percent by weight SrO and about 1 to 8 percent by weight $Al_2O_3$ to provide a maximum ratio of SrO to $Al_2O_3$ of 1, the magnesia having an MgO content of about 95 to 98 percent, the ratio of SrO plus CaO to $SiO_2$ in the mixture being at least 2 to 1, briquetting the mixture, firing the briquettes at a temperature of about 2800 to 3100 F., and crushing the fired product.

5. A method as defined in claim 4 in which the proportion of SrO is about 1 to 2 percent, the proportion of $Al_2O_3$ is about 2 to 4 percent, and the MgO content of the magnesia is about 97 to 98 percent.

References Cited by the Examiner
UNITED STATES PATENTS

| | | | |
|---|---|---|---|
| 2,063,543 | 12/1936 | Erdmann | 106—62 |
| 2,336,360 | 12/1943 | Kleinschmidt et al. | 106—62 |
| 2,695,242 | 11/1954 | Woodward | 106—62 |

TOBIAS E. LEVOW, *Primary Examiner.*

J. E. POER, *Assistant Examiner.*